United States Patent [19]

Kuhl

[11] 4,407,036
[45] Oct. 4, 1983

[54] APPARATUS FOR REMOVAL OF MOLD FROM THE EXTERIOR OF MEAT PRODUCTS

[76] Inventor: Henry Y. Kuhl, Kuhl Rd., Flemington, N.J. 08822

[21] Appl. No.: 396,963

[22] Filed: Jul. 9, 1982

[51] Int. Cl.$^3$ ............................................. A22C 17/08
[52] U.S. Cl. ..................................................... 15/3.13
[58] Field of Search ....................... 15/3.12, 3.13, 3.14, 15/302, 306 B

[56] References Cited

U.S. PATENT DOCUMENTS

| | | | |
|---|---|---|---|
| 1,550,139 | 8/1925 | Bellio | 15/3.12 |
| 2,666,711 | 1/1954 | Crossett | 15/3.12 X |
| 3,430,278 | 3/1969 | Walter et al. | 15/3.13 |
| 3,936,900 | 2/1976 | Bende | 15/3.12 |

Primary Examiner—Chris K. Moore
Attorney, Agent, or Firm—Frederick A. Zoda; John J. Kane

[57] ABSTRACT

An apparatus and process for removing mold from the exterior of meat products, such as the casings of salami and pepperoni, is disclosed which includes a conveyor extending longitudinally through a plurality of stations for cleaning and drying the products. The meat product is placed upon the conveyor at an entry location and is then passed through a cleaning station which sprays refrigerated water at high pressure over the products. The nozzles for spraying the refrigerated water are placed above and below and to the sides of the conveyor carrying the salami or pepperoni. The conveyor then carries the meat roll to an air station which is adapted to blow ambient air across the conveyor carrying the meat to blow excessive water therefrom. The ambient air basically urges the water to be removed from the meat casing by the inertia of the air itself. The conveyor then carries the casings to a drying or heating station where heated air is blown over the salami or pepperoni to complete the drying operations. The conveyor then carries the cleansed and dried meat to an exit station for removal thereof. To hold the meat product in position upon the conveyor, a second upper conveyor may extend above the horizontal and lower conveyor and be adapted to rest downwardly upon the top of the lower conveyor. This upper conveyor will, by the weight thereof, thereby hold the individual meat pieces in place and prevent movement thereof during passage to the cleaning station, the air station and the heating station.

10 Claims, 5 Drawing Figures

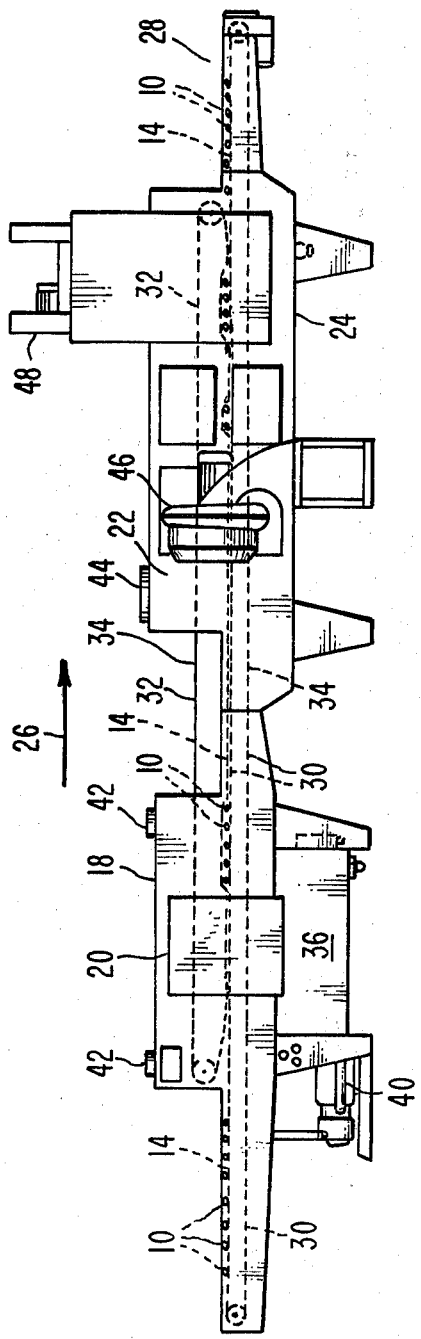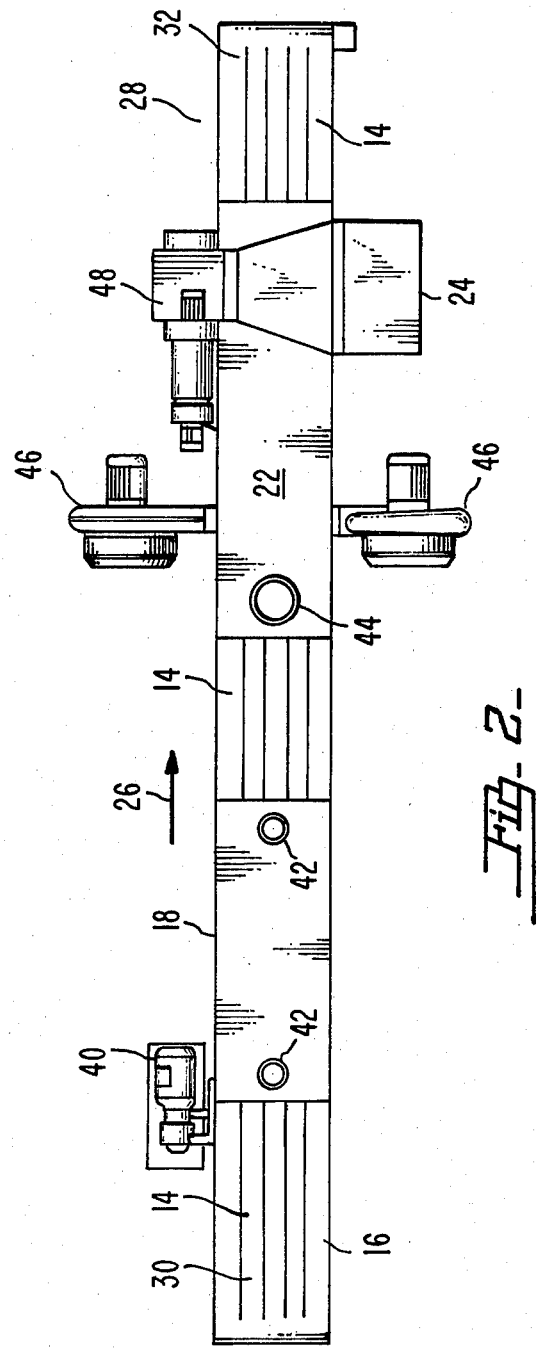

APPARATUS FOR REMOVAL OF MOLD FROM THE EXTERIOR OF MEAT PRODUCTS

BACKGROUND OF THE INVENTION

1. Field of the Invention

The present invention deals with the field of food processing machinery and in particular the field of machinery usable for the cleansing of meat products. The present invention is particularly adapted for usage with the cleansing of meat products placed in casings such as sausage, pepperoni, salami or pork roll. Also, the present invention can be used with any type of meat product which can accumulate mold on the exterior surface or casing thereof.

2. Description of the Prior Art

Such sausage meat products are cleaned by hand in order to remove the mold which has accumulated on the exterior thereof. This is the present mode of cleansing merely by spraying or scrubbing the meat casings. Such operations require excessive labor costs and as such is definitely cost prohibitive. Also, by hand washing frequently the castings themselves are ripped or in another manner damaged thereby increasing the amount of waste product after the mold removal step. The present invention provides a novel means for cleaning of the mold completely from the exterior casing of the meats without damaging the casing itself.

SUMMARY OF THE INVENTION

The present invention provides an apparatus as well as a process for removal of mold from the exterior casing of meat products such as pepperoni and sausage. The present invention includes a conveyor means which extends longitudinally and is adapted to carry the meat products for processing thereof through a plurality of processing stations.

The conveyor means initially defines an entry station normally at one end of the processing conveyor which is adapted to be the location of initial placement of meat products thereon. A cleansing station is positioned along the downstream line of the conveyor adjacent to the entry station. This cleaning station includes a plurality of nozzles through which refrigerated water is delivered by way of a high pressure pump. This configuration comprises a refrigerated water delivery means which is thereby adapted to spray this refrigerated water under pressure onto the meat products from above, below and from the sides to thereby completely remove any mold from the external casing of the meat products without damaging of the external casing.

The conveyor means then carriers the meat products to an air station at a location adjacent to and downstream from the cleaning station. This air station is adapted to blow ambient air over the meat products as they travel therethrough to knock off as much water as possible from the external casing thereof. A conveyor means then carries the meat products to a heating station next downstream from the air station where heated air is blown on the meat products. This heated air tends to increase the temperature of the meat product itself as well as evaporating any moisture still remaining on the external casing of the meat products. In this way the product is restored to the original temperature which was lower during processing due to the spraying of refrigerated water thereover.

The conveyor means then carries the meat product to an exit station immediately downstream from the heating station to provide a location for removal of the finally cleaned meat products.

It is preferable to fixedly secure the meat product as it is traveling upon the conveyor means and in this manner the conveyor means preferably includes a dual configuration. The conveyor means preferably includes a lower conveyor member which extends approximately horizontally and longitudinally to support the meat products thereabove. A second complementary upper conveyor means also extends approximately horizontally and longitudinally in a location immediately above the lower conveyor member. This upper conveyor member travels at approximately the same speed as the lower conveyor member and is adapted to gently lay upon the upper surface of the lower conveyor member as well as upon the upper surface of the meat products being carried thereon. In this manner the upper conveyor member by the gravitational weight thereof will cause the meat products to be held in place upon the lower conveyor member. In this manner the meat will be held in place during movement through the cleaning station, the air station and the heating station while the meat product is being exposed to high pressure, refrigerated water, ambient air, and heated air. It is only necessary that the upper conveyor mate with the lower conveyor during those three stations and as shown in the figures of the present invention, the upper conveyor preferably will only extend through these three stations whereas the lower conveyor will also extend beyond in both directions into the entry area and the exit area.

The refrigerated water is the basic cleansing agent of the present invention and the temperature of the refrigeration is critical. It has been found that refrigerated water between 65°–75° F. provides the maximum cleaning effect while minimizing damage to the casing of the meat products. It is also preferable that the dispensing of this refrigerated water be from above, below and the side and in this manner a plurality of nozzles should be arrayed completely surrounding the conveyor means as it travels through the cleaning station. Also, a tank means is preferably included in the cleaning station below the conveyor to receive refrigerated water after it has been sprayed upon the meat products such that it can be again pumped through a high pressure pump back into the line for delivery through the nozzles onto the next grouping of meat products.

It is an object of the present invention to provide an apparatus and process for removal of mold from the exterior of meat products which minimizes manual labor necessary to perform this removal.

It is an object of the present invention to provide an apparatus and process for removal of mold from the exterior of meat products which requires a minimum amount of time and a minimum length of conveyor processing.

It is an object of the present invention to provide an apparatus and process for removal of mold from the exterior of meat products which sprays refrigerated water of approximately 65°–75° F. over a meat product such as pepperoni or sausage.

It is an object of the present invention to provide an apparatus and process for the removal of mold from the exterior of meat products which requires a minimum amount of maintenance in relation to the amount of products which can be processed therethrough.

It is an object of the present invention to provide an apparatus and process for the removal of mold from the exterior of meat products which includes a complementary conveyor means positioned above the main conveyor adapted to rest gently upon the meat products as they pass through the processing stations to prevent movement thereof during cleansing and drying.

It is an object of the present invention to provide an apparatus and process for the removal of mold from the exterior of meat products wherein the conveyor means is an endless wire belt conveyor.

It is an object of the present invention to provide an apparatus and process for the removal of mold from the exterior of meat products which includes a tank means positioned below the meat product in the cleaning station to allow the refrigerated water to be recirculated.

It is an object of the present invention to provide an apparatus and process for the removal of mold from the exterior of meat products which includes a means for wet cleaning of the exterior casings of the meat products as well as a double step for drying and warming the final product.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a side plan view of an embodiment of an apparatus illustrating the present invention;

FIG. 2 is a top plan view of an embodiment of the apparatus as shown in FIG. 1;

DETAILED DESCRIPTION OF THE PREFERRED EMBODIMENT

Figure 3:
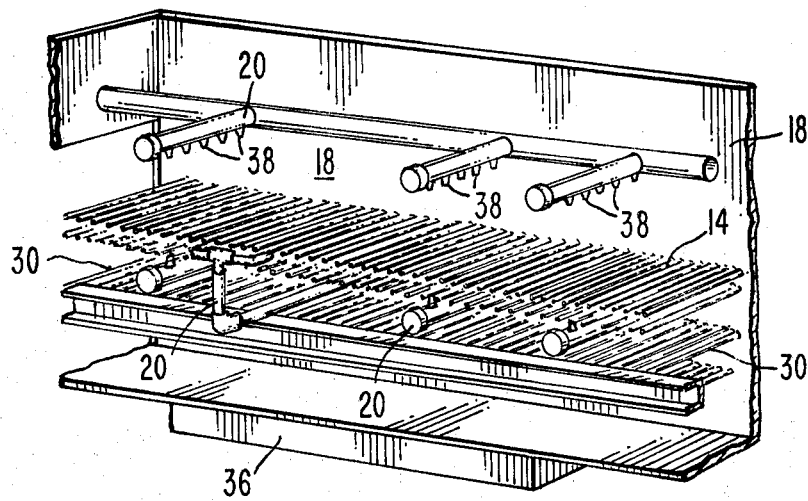
FIG. 3 is a side view of an embodiment of the interior of a cleaning station illustrating the process of the present invention.

The present invention discloses an apparatus as best shown in FIGS. 1 and 2 in its entirety which is particularly useful for the cleaning of mold which tends to adhere to the external surface of certain meats. The meats which are most susceptible to such mold are sausage, pepperoni, salami and other meats sometimes held in casings. The meat product is shown in these figures as item 10 placed upon a conveyor means 14 and adapted to carry the meat throughout the different processing stations.

With this process, the meats are initially placed upon an entry station 16 where the conveyor means 14 extends therethrough. Actually, the lower conveyor member 30 extends into the entry station 16 and is adapted to carry the sausage 10 into the initial or cleaning station 18. Cleaning station 18 is adapted to initially remove all of the mold from the exterior casing of the sausage 10 and this is accomplished by a refrigerated water delivery means 20. Means 20 includes a plurality of nozzles 38 arranged in an array extending completely about or completely encircling the conveyor means 14 as it extends through the cleaning station 18. A high pressure pump 40 is adapted to pump refrigerated water of 65° to 75° F. from a tank means 36 within cleaning station 18. The high pressure pump 40 delivers this refrigerated water to the nozzles 38 for spraying over the meat products 10 positioned upon conveyor means 14. With a significant amount of pressure from the pump 40 all of the mold can be removed from all sides of the salami or pepperoni at this point by this refrigerated water. The water, after it carries away the mold, is then allowed to fall downwardly into the tank means 36 for recirculation through the high pressure pump 40. Exhaust ducts 42 in the cleaning station 18 provides venting. The refrigerated water is delivered by high pressure pump 40 at a pressure of 160-240 lbs. per square inch or preferably at approximately 200 lbs. per square inch. This pressure is usable with all types of pepperoni, salami and also sausage except those having natural skins as commonly used with pepperoni. Under such conditions it is necessary to have refrigerated water supplied in a range from 40-60 lbs. per square inch or approximately at 50 lbs. per square inch in order to avoid damage to such natural skins.

The conveyor means 14 then carries the meat product 10 from the cleaning station 18 into the next station which is air station 22. Here a blower 46 or two such blowers is adapted to blow ambient air at a significant speed across the meat products 10. An exhaust duct 44 allows ventilation here. Blower 46 has a significant enough ability to move air such that the momentum of the air will literally knock the water off the external casing. In this manner excessive moisture can be removed and merely leave the external casing of the product 10 to be somewhat damp.

To achieve final drying the conveyor means 14 is adapted to carry the meat product 10 to the next station which is heating station 24. The movement of the conveyor is shown by downstream direction arrow 26. In the heating station 24 a heat exchanger blower 48 blows warm air across the meat product 10 located upon the conveyor means 14 to evaporate any water remaining on the product after it has exited the air station 22.

Figure 5:
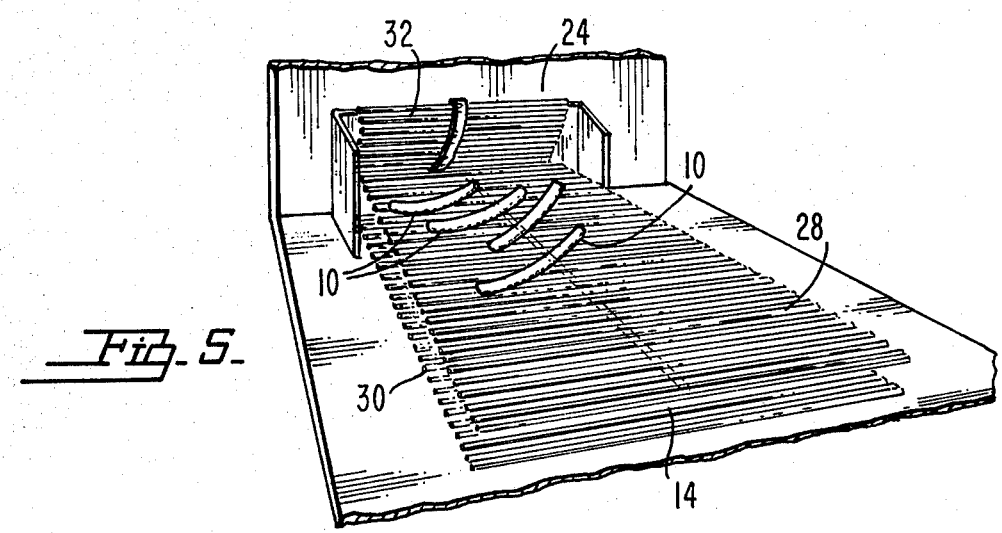
FIG. 5 is a perspective view of an embodiment of the exit station and heating station of the present invention.

Conveyor means 14 then carries the now cleaned and dried meat product 10 to the exit station 28 as shown best in FIG. 5. At this point, the product can be removed and the automatic process for mold removing has been completed.

Figure 4:
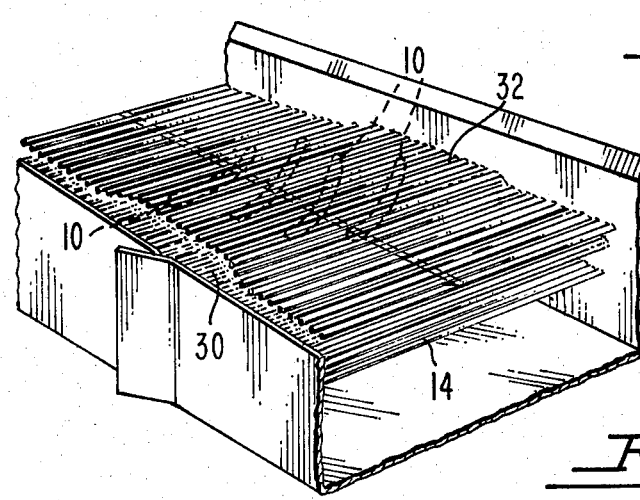
FIG. 4 is a perspective view of an embodiment of the complementary upper and lower conveyor members.

A significant amount of air and water is blown over the product in the cleaning station 18, the air station 22, and the heating station 24. This tends to move the product about when it is carried upon the conveyor means 14. To minimize this movement, conveyor means 14 preferably includes a two element conveyor including the previously described lower conveyor member 30 as well as an upper conveyor member 32. Each of these conveyors is preferably an endless wire belt conveyor 34 operating about sprockets or gears to continuously move the endless metal belt. The lower conveyor member 30 is the supporting conveyor and is adapted to actually receive the meat product 10 when placed at the entry station 16. This lower conveyor member 30 also extends into the exit station to allow removal of the meat product 10 therefrom. On the other hand, the upper conveyor member 32 which is adapted to hold the meat products in place only must necessarily extend through the cleaning station 18, the air station 22, and the heating station 24. It is in these three areas where the product must be held in place upon the conveyor means 14. The upper conveyor member 32 actually uses the gravitational force from the weight thereof to hold the product in place. As shown in FIGS. 1 and 4, the upper conveyor member 32 is loose enough upon the sprockets which support it such that it can rest downwardly upon the upper surface of the lower conveyor and upon the upper surface of the meat products 10 traveling upon the lower conveyor member 30. In this manner a wavy upper appearance as best shown in FIG. 4 is achieved. This configuration facilitates the locking of the salami or pepperoni in place to prevent movement thereof when the meat 10 is subjected to the high pressure pumps for the water in the cleaning station 18 and the high pressure blowers in the air station 22 and the heating station 24. As shown in FIG. 5, the upper conveyor member 32 is removed from contact with the meat product after it has passed through the final heating station 24 and is ready to move to the exit station 28.

While particular embodiments of this invention have been shown in the drawings and described above, it will be apparent that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for removal of mold from the exterior of meat products comprising:
(a) a conveyor means extending longitudinally adapted to carry meat products for processing thereof to effect removal of mold from the exterior thereof;
(b) an entry station adjacent said conveyor means and adapted to be at the location of initial placement of meat products thereon;
(c) a cleaning station positioned along said conveyor means at a location adjacent to and downstream from said entry station, said cleaning station including a refrigerated water delivery means adapted to spray refrigerated water under pressure onto the meat products to remove any mold adhering to the exterior thereof;
(d) an air station positioned along said conveyor means at a location adjacent to and downstream from said cleaning station, said air station adapted to blow air under pressure over meat products traveling upon said conveyor means for drying thereof;
(e) a heating station positioned along said conveyor means at a location adjacent to and downstream from said air station, said heating station adapted to blow heated air under pressure over meat products traveling upon said conveyor means to complete drying and warming thereof; and
(f) an exit station positioned along said conveyor means at a location adjacent to and downstream from said heating station, said exit station providing the location for removal of cleaned meat products.

2. The apparatus as defined in claim 1 wherein said conveyor means comprises:
(a) a lower conveyor member extending approximately horizontaly and longitudinally to support meat products thereabove for processing;
(b) an upper conveyor member extending approximately horizontally and longitudinally above said lower conveyor member and the meat products traveling thereon, said upper conveyor member moving at approximately the same rate of speed as said lower conveyor member, said upper conveyor member adapted to rest upon the upper surface of the meat products and said lower conveyor means within said cleaning station, said air station and said heating station to hold the meat products in place during processing.

3. The apparatus as defined in claim 2 wherein the downward gravitational weight of said upper conveyor member holds the meat products in place upon said lower conveyor member.

4. The apparatus as defined in claim 1 wherein said refrigerated water delivery means maintains the water at 65°–75° F.

5. The apparatus as defined in claim 1 wherein said refrigerated water delivery means includes a plurality of nozzles deployed in an array completely surrounding said conveyor means and the meat products traveling thereon.

6. The apparatus as defined in claim 1 wherein said conveyor means includes an endless wire belt conveyor.

7. The apparatus as defined in claim 1 wherein said cleaning station includes a tank means below said conveyor means traveling therethrough to hold and recirculate refrigerated water.

8. The apparatus as defined in claim 1 wherein said cleaning station delivers refrigerated water at 160–240 lbs. per square inch pressure.

9. The apparatus as defined in claim 1 wherein said cleaning station delivers refrigerated water at 40–60 lbs. per square inch pressure.

10. An apparatus for removal of mold from the exterior of meat products comprising:
(a) a conveyor means extending longitudinally adapted to carry meat products for processing thereof to effect removal of mold from the exterior thereof, said conveyor means further including:
(1) a lower conveyor member extending approximately horizontally and longitudinally to support meat products thereabove for processing, said lower conveyor member including and endless wire belt conveyor;
(2) an upper conveyor member extending approximately horizontally and longitudinally above said lower conveyor member and the meat products traveling thereon, said upper conveyor member including an endless wire belt conveyor, said upper conveyor member moving at approximately the same rate of speed as said lower conveyor member, said upper conveyor member adapted to rest upon the upper surface of the meat products and said lower conveyor means to hold the meat products in place during processing thereof by gravitational weight of said upper conveyor member thereon;
(b) an entry station adjacent said conveyor means adapted to be the location of initial placement of meat products thereon;
(c) a cleaning station positioned along said conveyor means at a location adjacent to and downstream from said entry station, said cleaning station including a refrigerated water delivery means adapted to spray refrigerated water under pressure onto the meat products to remove any mold adhering to the exterior thereof, said cleaning station including a tank means positioned below said conveyor means to hold and recirculate refrigerated water, said refrigerated water delivery means being adapted to maintain the water at 65°–75° F., said refrigerated water delivery means including a plurality of nozzles deployed in an array completely surrounding said conveyor means and the meat products traveling thereon;

(d) an air station positioned along said conveyor means at a location adjacent to and downstream from said cleaning station, said air station adapted to blow air under pressure over meat products traveling upon said conveyor means for drying thereof;

(e) a heating station positioned along said conveyor means at a location adjacent to and downstream from said air station, said heating station adapted to blow heated air under pressure over meat products traveling upon said conveyor means to complete drying and warming thereof; and (f) an exit station positioned along said conveyor means at a location adjacent to and downstream from said heating station, said exit station providing the location for removal of cleaned meat products.

* * * * *